(12) United States Patent
Saoud et al.

(10) Patent No.: US 9,745,439 B1
(45) Date of Patent: Aug. 29, 2017

(54) METHODS OF FORMING AEROGELS

(71) Applicant: Qatar Foundation for Education, Science and Community Development, Doha (QA)

(72) Inventors: Khaled M. Saoud, Doha (QA); Shaukat Saeed, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 0 days.

(21) Appl. No.: 15/151,059

(22) Filed: May 10, 2016

(51) Int. Cl.
    *C08J 9/28* (2006.01)
    *C04B 14/06* (2006.01)
    *C01B 33/158* (2006.01)
    *C04B 24/42* (2006.01)

(52) U.S. Cl.
    CPC ............ *C08J 9/28* (2013.01); *C01B 33/1585* (2013.01); *C04B 14/064* (2013.01); *C04B 24/42* (2013.01); *C08J 2201/04* (2013.01); *C08J 2203/08* (2013.01); *C08J 2205/026* (2013.01); *C08J 2335/02* (2013.01)

(58) Field of Classification Search
    CPC ................ C08J 2205/026; C01B 33/1585
    See application file for complete search history.

(56) References Cited

U.S. PATENT DOCUMENTS

| 4,904,504 A * | 2/1990 | Isozaki | ............... C09D 5/1675 |
| | | | 427/387 |
| 8,227,363 B2 | 7/2012 | Leventis et al. | |
| 8,957,050 B2 | 2/2015 | Lamberti et al. | |
| 2005/0192366 A1 * | 9/2005 | Ou | ........................ C01B 33/158 |
| | | | 521/64 |
| 2006/0281828 A1 * | 12/2006 | Nakayama | ............... B05D 5/08 |
| | | | 522/71 |

FOREIGN PATENT DOCUMENTS

WO    03/072155 A1    9/2003

OTHER PUBLICATIONS

Translation of FR 3018207 by Bonnardel et al. Published Sep. 11, 2015.*
Maleki, H.; Duraes, L.; Portugal, A. An overview on silica aerogels synthesis and different mechanical reinforcement strategies. Journal of Non-Crystalline Solids 385 (2014) 55-74.*
Pope, E.J.A.; Mackenzie, J.D. Sol-Gel Processing of Silica II. The role of the catalyst. Nov. 20, 1985. Journal of Non-Crystalline Solids 87 (1986) 185-198.*
Wingfield, C.; Franzel, L.; Bertino, M.; Leventis, N. Fabrication of functionally graded aerogels, cellular aerogels and anisotropic ceramics. Journal of Materials Chemistry, 2011, 21, 11737.*
Coherent. Verdi V Series. Accessed via Wayback Machine to Apr. 26, 2014. Available at http://coherent.com/products/?1852/Verdi-V-Series.*

(Continued)

*Primary Examiner* — Mike M Dollinger
*Assistant Examiner* — Christina Wales
(74) *Attorney, Agent, or Firm* — Hoffmann & Baron, LLP

(57) ABSTRACT

The present invention relates to methods of forming aerogels.

26 Claims, 5 Drawing Sheets

(56) References Cited

OTHER PUBLICATIONS

Shaukat Saeed, Rola M. Al-Sobaihi, Massimo F. Bertino, Lauren S. White and Khaled M. Saoud. "Laser induced instantaneous gelation: aerogels for 3D printing". J. Mater. Chem. A, 2015,3, 17606-17611.*

Shaukat Saeed, Rola M. Al Soubaihi, Lauren S. White, Massimo F. Bertino, Khaled M. Saoud. "Rapid fabrication of cross-linked silica aerogel by laser induced gelation". Microporous and Mesoporous Materials vol. 221, Feb. 2016, pp. 245-252.*

Maury, et al., "Influence of the sol-gel chemistry on the activity of a lipase encapsulated in a silica aerogel", Journal of Molecular Catalysis, vol. 29, issue 1-6, 2004, pp. 133-148.

Schneider, et al., Aerogels in Catalysis, Catal. Rev.-Sci. Eng., 37(4), 1995, pp. 515-556.

Hrubesh, et al., Solvent removal from water with hydrophobic aerogels, Journal of Non-Crystalline Solids, 285, 2001, pp. 328-332.

Kim, et al., "Synthesis of window glazing coated with silica aerogel films via ambient drying", Journal of Non-Crystalline Solids, vol. 320, issue 1-3, 2003, pp. 125-132.

Baetens, et al., "Aerogel insulation for building applications: A state-of-the-art review", Energy and Buildings, 42, 2011, pp. 761-769.

Heckman, et al., "Sol-Gel Materials for High Capacity, Rapid Removal of Metal Contaminants", Separation Science and Technology, 43, 2008, pp. 1474-1487.

S. Jones, "A method for producing gradient density aerogel", J. Sol-Gel Sci Technol, 44, 2007, pp. 255-258.

Leventis, et al., "Nanoengineering Strong Silica Aerogels", Nano Letters, vol. 2, No. 9, 2002, pp. 957-960.

Leventis, et al., "Polymer-Crosslinked Aerogels", Aerogels Handbook, 2011, pp. 251-285.

White, et al., "Influence of silica derivatizer and monomer functionality and concentration on the mechanical properties of rapid synthesis cross-linked aerogels", Microporous and Mesoporous Materials, 217, 2015, pp. 244-252.

Wingfield, et al., "Fabrication of functionality graded aerogels, cellular aerogels and anisotropic ceramics", J. Mater. Chem., 21, 2011, pp. 11741-11741.

Franzel, et al., "Regioselective cross-linking of silica aerogels with magesium silicate ceramics", J. Mater. Chem. A, 1, 2013, pp. 6021-6029.

Schmidt, et al., "Applications for silica aerogel products", Journal of Non-Crystalline Solids, 225, 1998, pp. 364-368.

Anderson, et al., "Silica aerogels prepared via rapid supercritical extraction: Effect of process variables on aerogel properties", Journal of Non-Crystalline Solids, 355, 2009, pp. 101-108.

White, et al., "Shortened aerogel fabrication times using an ethanol-water azeotrope as a gelation and drying solvent", J. Mater. Chem. A, 3, 2015, pp. 762-772.

Avens, et al., "Mechanism of Cyclic Dye Regeneration During Eosin-Sensitized Photoinitiation in the Presence of Polymerization Inhibitors", Journal of Polymer Science, Part A, vol. 47, issue 22, 2009, pp. 6083-6094.

Burget, et al., "Photopolymerizaton of thiol-allyl ether and thiol-acrylate coatings with visible light photosensitive systems", Polymer, 45, issue 19, 2004, pp. 6561-6567.

Matsuoka et al., "Heat of Reaction of the Hydrolysis-Polymerization of Tetraethyl Orthosiliate in Acidic Condition", Journal of Sol-Gel Science and Technology, 19, 2000, pp. 661-664.

Sakka, et al., "The Sol-Gel Transition in the Hydrolysis of Metal Alkoxides in Relation to the Formation of Glass Fibers and Films", Journal of Non-Crystalline Solids, 48, 1982, pp. 31-46.

Miyazaki, et al., "Polymerization of multifunctional methacrylates and acrylates", Journal of Biomedical Materials R0.esearch. vol. 22, 1988, pp. 1011-1022.

Horie, et al., "Calorimetric Investigation of Polymerization Reactions. V. Crosslinked Copolymerization of Methyl Methacrylate with Ethylene Dimethacrylate", Journal of Polymer Science, vol. 13, 1975, pp. 445-454.

Osterholtz, et al., "Kinetics of the hydrolysis and condensation of organofunctional alkoxysilanes: a review", J. Adhesion Sci. Technol., vol. 6, No. 1, 1992, pp. 127-149.

M. Bertino, "Anisotropic Aerogels by Photolithography", Aerogels Handbook, 2011, pp. 403-418.

Gopal, et al., "EPR, optical, infrared and Raman spectral studies of Actinolite mineral", Spectrochimica acta. Part A., vol. 60, 2004, pp. 2441-2448.

Duran, et al., "Structural Considerations About SiO2 Glasses Prepared by Sol-Gel", Journal of Non-Crystalline Solids, 32, 1986, pp. 69-77.

Lewis, et al., "NMR and Electron Microscopic Investigation of Polymerized Coatings Prepared from Methacrylate-Functionalized Silica in an Acrylic Monomer Matrix", Chem. Mater. 7, 1995, pp. 1369-1375.

Ek, et al., "A 29Si and 13C CP/MAS NMR Study on the Surface Species of Gas-Phase-Deposited y-Aminopropylalkoxysilanes on Heat-Treated Silica", J. Phy. Chem. B, 108, 2004, pp. 11454-11463.

Lu, et al., "Mechanical Characterization of Aerogels", Aerogels Handbook, 2011, pp. 499-535.

K. G. Sharp, "A Two-Component, Non-Aqueous Route to Silica Gel", Journal of Sol-Gel Science and Technology, 2, 1994, pp. 35-41.

Friberg, et al., "Reaction between Copper Nitrate Hydrate and Tetraethoxysilane in Methanol. A 29Si NMR Investigation", J. Phys. Chem, 98, 1994, pp. 13528-13531.

Giray, et al., "PEG Hydrogel Encapsulation of Eosin Functionalized Hydrophobic Aerogels via Supercritical Fluid Routes", Dept. of Chemical and Biological Engineering, Ko University, Istanbul, Turkey, 6 pages, May 2010.

C. Wingfield, "Fabrication of Anisotropic Sol-gel Materials by Photo-Crosslinking", Virginia Commonwealth University, Graduate School, 2012, pp. 1-29.

Cevik, et al., "Visible-Light-Induced Synthesis of pH Responsive Composite Hydrogels for Controlled Delivery of an Anticonvulsant Drug Pregabalin", Acta Biomaterialia, Jan. 2015, 35 pages.

Saeed, et al., "Laser induced instantaneous gelation: aerogels for 3D printing", J. Mater. Chem. A, 3, 2015, pp. 17606-17611.

Saeed et al., "Rapid fabrication of cross-linked silica aerogel by laser induced gelation", Microporous and Mesoporous Materials, 221, 2016, pp. 245-252.

* cited by examiner

METHODS OF FORMING AEROGELS

The present invention relates to methods of forming aerogels. In particular, the present invention relates to methods of forming silica aerogels.

BACKGROUND

Lightweight materials with adequate mechanical properties are highly desired for various structural applications. It is speculated that in the near future every structure, simple or complex, will be fabricated using 3D printing technology. Various materials being explored for 3D printing are laser sintered metals, photo-crosslinked polymers and extruded molten polymers. However, all these materials have inherently high densities which render them unsuitable for lightweight structures.

Silica aerogels are highly porous materials, composed of over 90% air and the rest as silica network structure. This unique composition and structure impart peculiar properties such as high surface area, very low bulk density and low thermal conductivity. They find applications in at least catalysis,[1,2] adsorption,[3] thermal insulation,[4,5] environmental remediation[6] and space exploration.[7]

Aerogels are not generally seen as a structural material for a number of reasons. They are fragile, synthesis requires several steps, and drying is complex and time-consuming.

Aerogel fragility issues have been addressed in large part by the Leventis group,[8,9] who crosslinked the skeletal oxide nanoparticles with a conformal polymer coating. Crosslinking increases mechanical strength by orders of magnitude without overly compromising porosity. The strengthening strategies include use of higher functionality cross-linker, selective crosslinking of the regions subject to shear and mechanical stress, and specific patterning like honeycomb structures to increase compressive strength of aerogels along the load-bearing direction.[10-12]

Drying is another issue affecting aerogel applications. To reduce capillary forces (which cause cracking during drying), supercritical $CO_2$ is typically employed. However, supercritical $CO_2$ drying requires multiple, time-consuming solvent exchanges, which make the method impractical for large-scale applications. Drying issues have been partially addressed by Schwertfeger et al.,[13] and, more recently, the groups of Anderson and Carroll[14] and the present inventors' group[15] developed drying techniques employing supercritical ethanol that eliminated time consuming solvent exchange steps.

Even with the mitigation of these issues, a processing bottleneck remains, and that is the synthesis of wet gels. Gelation times depend strongly on precursor concentration and pH, and in most cases are on the order of tens of minutes to hours. After gelation, wet gels need to be cured for hours to days to strengthen the silica network.

There is no report on rapid fabrication of mechanically strong aerogels that includes the capability of printing 3D structures.

The present invention seeks to address the problems identified above.

SUMMARY

The present invention is as set out in the following clauses:

1. A method of forming an aerogel, the method comprising the steps of:
    forming a first solution comprising an alkoxide, a Lewis acid and a coupling agent;
    forming a second solution comprising a radical photoinitiator, a co-initiator and monomers;
    mixing the first solution and the second solution to form a pre-gelation mixture;
    heating the pre-gelation mixture by applying microwave radiation to form a heated pre-gelation mixture; and,
    applying visible laser light to the heated pre-gelation mixture to form an aerogel.

2. The method of clause 1, wherein the method of forming an aerogel is for forming a silica aerogel.

3. The method of clause 1 or clause 2, wherein the method further comprises the step of:
    supercritically drying the aerogel.

4. The method of any one of clauses 1 to 3, wherein after the step of forming the first solution, the first solution is heated by applying microwave radiation.

5. The method of any one of clauses 1 to 4, wherein after the step of forming the second solution, the second solution is heated by applying microwave radiation.

6. The method of any one of clauses 1 to 5, wherein the steps of forming the first solution and forming the second solution include forming the first solution and the second solution in separate vessels.

7. The method of clause 6, wherein the step of mixing the first solution and second solution to form a pre-gelation mixture includes mixing the first solution and the second solution in one vessel.

8. The method of any one of clauses 1 to 7, wherein the step of heating the pre-gelation mixture by applying microwave radiation to form a heated pre-gelation mixture includes applying microwave radiation at a power of up to 1200 W, or up to 1100 W, or up to 1000 W, or up to 900 W, or up to 800 W, or up to 700 W, or up to 600 W, or up to 500 W, or up to 400 W.

9. The method of any one of clauses 4 to 8, wherein the step of heating either one or both of the first solution and/or the second solution by applying microwave radiation includes applying microwave radiation at a power of up to 1200 W, or up to 1100 W, or up to 1000 W, or up to 900 W, or up to 800 W, or up to 700 W, or up to 600 W, or up to 500 W, or up to 400 W.

10. The method of any one of clauses 1 to 9, wherein the step of heating the pre-gelation mixture by applying microwave radiation to form a heated pre-gelation mixture includes applying microwave radiation for up to 2 minutes, or up to 1.5 minutes, or up to 1 minute, or up to 50 seconds, or up to 40 seconds, or up to 30 seconds, or up to 20 seconds, or up to 10 seconds, or up to 5 seconds, or up to 4 seconds, or up to 3 seconds, or up to 2 seconds, or up to 1 second.

11. The method of any one of clauses 1 to 10, wherein microwave radiation refers to electromagnetic waves as produced in microwave ovens.

12. The method of any one of clauses 1 to 11, wherein microwave radiation refers to electromagnetic waves with a frequency of 2.45 GHz (wavelength 12 cm), plus or minus 10%, plus or minus 9%, plus or minus 8%, plus or minus 7%, plus or minus 6%, plus or minus 5%, plus or minus 4%, plus or minus 3%, plus or minus 2% or plus or minus 1%.

13. The method of any one of clauses 1 to 12, wherein the step of applying visible laser light to the heated pre-gelation mixture to form an aerogel includes applying laser light generated by a 2 Watt, continuous wave, diode-pumped solid-state laser emitting light at a wavelength of 532 nm, plus or minus 10%, plus or minus 9%, plus or minus 8%, plus or minus 7%, plus or minus 6%, plus or minus 5%, plus or minus 4%, plus or minus 3%, plus or minus 2% or plus or minus 1%.

14. The method of any one of clauses 3 to 13, wherein the step of supercritically drying the aerogel includes drying the aerogel in supercritical ethanol.

15. The method of any one of clauses 1 to 14, wherein the molar ratios of reactants in the first solution are:
   alkoxide: 90-98
   Lewis acid: 0.0002-0.0006
   coupling agent: 1.9994-9.9998.
16. The method of any one of clauses 1 to 15, wherein the molar amounts of reactants in the second solution are:
   radical photoinitiator 6-20
   co-initiator: 5-9
   monomers: 75-85.
17. The method of any one of clauses 1 to 16, wherein the alkoxide is an alkoxysilane.
18. The method of any one of clauses 1 to 17, wherein the alkoxide is tetraethyl orthosilicate or tetramethyl orthosilicate.
19. The method of any one of clauses 1 to 18, wherein the Lewis acid is aluminium chloride hexahydrate or aqueous hydrochloric acid.
20. The method of any one of clauses 1 to 19, wherein the coupling agent is 3-(trimethoxysilyl)propyl methacrylate, vinyltrimethoxysilane or allyltrimethoxysilane.
21. The method of any one of clauses 1 to 20, wherein the radical photoinitiator is Eosin Y, Eosin B or Eosin Y disodium salt.
22. The method of any one of clauses 1 to 21, wherein the co-initiator is a tertiary amine.
23. The method of clause 22, wherein the co-initiator is N-methyldiethanolamine, N-ethyldiethanolamine or ammonium hydroxide.
24. The method of any one of clauses 1 to 23, wherein the monomers are 1,6-hexanediol diacrylate, vinyl acrylate, vinyl methacrylate, 1,4-butanediol diacrylate, glycerol 1,3-diglycerolate diacrylate, styrene, methyl methacrylate, butyl methacrylate, butyl acrylate, tert-butyl acrylate, tris(2-acryloyloxyethyl) isocyanurate, neopentyl glycol diacrylate, pentaerythritol tetraacrylate, trimethylolpropane triacrylate, di(trimethylolpropane) tetraacrylate, glycerol propoxylate (1PO/OH) triacrylate, bisphenol A ethoxylate diacrylate, 1,3,5-triacryloylhexahydro-1,3,5-triazine, glycerol 1,3-diglycerolate diacrylate, trimethylolpropane propoxylate triacrylate or pentaerythritol triacrylate.
25. The method of any one of clauses 1 to 24, wherein:
   the alkoxide is tetraethylorthosilicate;
   the Lewis acid is aluminium chloride hexahydrate;
   the coupling agent is 3-(trimethoxysilyl) propyl methacrylate;
   the radical photoinitiator is Eosin Y;
   the co-initiator is N-methyldiethanolamine;
   the monomers are 1,6-hexanediol diacrylate.
26. The method of clause 25, wherein the molar ratios of the reactants are:
   0.9519 tetraethylorthosilicate;
   0.0004760 aluminium chloride hexahydrate;
   0.04760 3-(trimethoxysilyl) propyl methacrylate.
27. The method of clause 25 or clause 26, wherein the molar ratios of the reactants are:
   0.138 Eosin Y;
   0.0712 N-methyldiethanolamine;
   0.79 1,6-hexanediol diacrylate.
28. An aerogel formed by a method according to any one of clauses 1 to 27.
29. A method of forming an aerogel substantially as hereinbefore described with reference to the figures.
30. Any novel feature or combination of features disclosed herein.

The presently claimed invention demonstrates that instantaneous gelation leading to mechanically strong and ultra-lightweight silica aerogels offers a new direction for the 3D industry to fabricate lightweight 3D structures with complex geometries using a visible light emitting low power laser.

The method of the presently claimed invention allows for instantaneous fabrication of alcogel monoliths. In one non-limiting example, the method of the presently claimed invention is demonstrated by the 3D printing of alphabetical letters.

In one non-limiting example the method of the presently claimed invention, a precursor solution of an alkoxide, a monomer and a visible-light photo-initiator is prepared and illuminated with a 2 Watt laser source. Illumination initiates free-radical polymerization. The heat of polymerization, in turn, induces gelation. Synthesis employs the ethanol-water azeotrope as a gelation solvent, thus, wet gels can be dried immediately after gelation using the technique developed by the present inventors' group.[15]

The present inventors demonstrate manual printing of 3D letters on different substrates like laminated paper, a glass slide and a silicon wafer using masking techniques, and also the printing of a 50 mm thick line on a glass substrate through direct shining of a laser on the liquid mixture without any mask. The samples were then dried at supercritical conditions along with the substrate and as self-standing objects. The technique may be extended to fabricate more complex 3D structures, thin films or any patterned objects from the ultralight aerogels.

BRIEF DESCRIPTION OF THE DRAWINGS

Embodiments of the invention are described below with reference to the accompanying drawings, in which.

DETAILED DESCRIPTION

Figure 1:
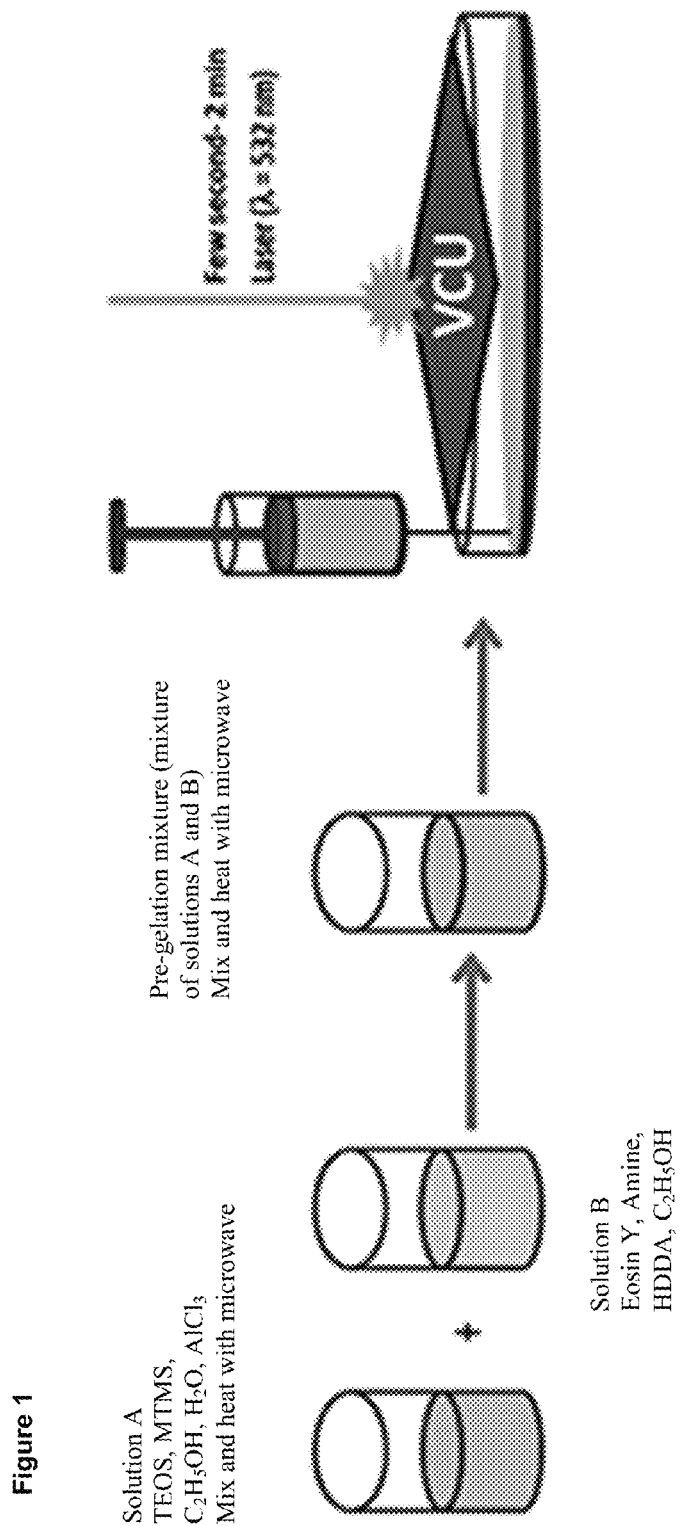
FIG. 1 shows a schematic for 3D printing of aerogel materials using green laser light.

The following explanations of terms and methods are provided to better describe the present compounds and methods, and to guide those of ordinary skill in the art in the practice of the present disclosure. It is also to be understood that the terminology used in the disclosure is for the purpose of describing particular embodiments and examples only and is not intended to be limiting.

"Aerogel" refers to a synthetic porous ultralight material derived from a gel, in which the liquid component of the gel has been replaced by a gas. Aerogels can be produced by extracting the liquid component of the gel by supercritical drying.

"Alcogel" refers to a substantially dilute cross-linked system which exhibits no flow in the steady state. By weight, alcogels are mostly liquid alcohol with a three-dimensional cross-linked network within the liquid alcohol.

"Alkoxide" refers to the conjugate base of an alcohol and therefore consists of an organic group bonded to a negatively charged oxygen atom. Some alkoxysilanes are alkoxides.

"Alkoxysilane" refers to compounds which contain an organic group bonded through an oxygen atom to a Si atom. Alkoxysilane refers to compounds of the general formula: $R_1O-SiR_2R_3R_4$, where $R_1$ is an organic group and $R_2$, $R_3$ and $R_4$ can be the same or different and can be H, an organic group or O bonded to an organic group. Optionally, $R_2$, $R_3$ and $R_4$ are the same as $-OR_1$.

"Alkyl" refers to straight-chain or branched-chain hydrocarbons having 1, 2, 3, 4, 5, 6, 7, 8, 9, 10, 11, 12, 13, 14, 15, 16, 17, 18, 19 or 20 carbon atoms linked exclusively by single bonds and not having any cyclic structure. Optionally, alkyl includes methyl, ethyl, n-propyl, isopropyl, n-butyl, isobutyl, sec-butyl, tert-butyl, pentyl, iso-amyl, hexyl, heptyl, octyl, noyl, decyl, undecyl, dodecyl tridecyl, tetradecyl, pentadecyl, hexadecyl, heptadecyl, octadecyl, nonadecyl and eicosyl.

"Aryl" refers to substituted or unsubstituted aromatic hydrocarbons with a conjugated cyclic molecular ring structure of 3, 4, 5, 6, 7, 8, 9, 10, 11 or 12 carbon atoms. Optionally, aryl includes monocyclic, bicyclic or polycyclic rings. Optionally, aryl includes one to three additional ring structures selected from the group consisting of a cycloalkyl, a cycloalkenyl, a heterocycloalkyl, a heterocycloalkenyl, or a heteroaryl. Optionally, aryl includes phenyl (benzenyl), thiophenyl, indolyl, naphthyl, totyl, xylyl, anthracenyl, phenanthryl, azulenyl, biphenyl, naphthalenyl, 1-methylnaphthalenyl, acenaphthenyl, acenaphthylenyl, anthracenyl, fluorenyl, phenalenyl, phenanthrenyl, benzo[a]anthracenyl, benzo[c]phenanthrenyl, chrysenyl, fluoranthenyl, pyrenyl, tetracenyl (naphthacenyl), triphenylenyl, anthanthrenyl, benzopyrenyl, benzo[a]pyrenyl, benzo[e]fluoranthenyl, benzo[ghi]perylenyl, benzo[j]fluoranthenyl, benzo[k]fluoranthenyl, corannulenyl, coronenyl, dicoronylenyl, helicenyl, heptacenyl, hexacenyl, ovalenyl, pentacenyl, picenyl, perylenyl, and tetraphenylenyl. Optionally, aryl refers to aryls substituted with 1, 2, 3, 4 or 5 substituents selected from the group consisting of H, lower alkyl, aryl, alkenyl, alkynyl, arylalkyl, alkoxy, aryloxy, arylalkoxy, alkoxyalkylaryl, alkylamino, arylamino, $NH_2$, OH, CN, $NO_2$, $OCF_3$, $CF_3$, Br, Cl, F, 1-amidino, 2-amidino, alkylcarbonyl, morpholino, piperidinyl, dioxanyl, pyranyl, heteroaryl, furanyl, thiophenyl, tetrazolo, thiazole, isothiazolo, imidazolo, thiadiazole, thiadiazole S-oxide, thiadiazole S,S-dioxide, pyrazolo, oxazole, isoxazole, pyridinyl, pyrimidinyl, quinoline, isoquinoline, SR''', SOR''', $SO_2R'''$, $CO_2R'''$, COR''', CONR'''R''', CSNR'''R''' and SOnNR'''R''', wherein R''' is alkyl or substituted alkyl.

"Gelation" refers to a method of forming a gel.

"Instantaneous gelation" refers to gelation which occurs in 10 seconds or less, 9 seconds or less, 8 seconds or less, 7 seconds or less, 6 seconds or less, 5 seconds or less, 4 seconds or less, 3 seconds or less, 2 seconds or less, or 1 second or less.

"Instantaneous polymerization" refers to polymerization which occurs in 10 seconds or less, 9 seconds or less, 8 seconds or less, 7 seconds or less, 6 seconds or less, 5 seconds or less, 4 seconds or less, 3 seconds or less, 2 seconds or less, or 1 second or less.

"Microwave radiation" refers to electromagnetic waves having a wavelength in the range from 1 mm to 1 m and a frequency in the range from 300 GHz to 300 MHz. Optionally, "microwave radiation" refers to electromagnetic waves as produced in microwave ovens, for example with a frequency of 2.45 GHz (wavelength 12 cm) plus or minus 10%, plus or minus 9%, plus or minus 8%, plus or minus 7%, plus or minus 6%, plus or minus 5%, plus or minus 4%, plus or minus 3%, plus or minus 2% or plus or minus 1%.

"Monomer" refers to a molecule which may chemically bond to other molecules to form a polymer.

"Optional" or "optionally" means that the subsequently described event or circumstance can but need not occur, and that the description includes instances where said event or circumstance occurs and instances where it does not.

"Organic group" refers to functional groups containing at least one carbon atom, for example substituted or unsubstituted alkyl, alkenyl, alkynyl or aryl groups.

"Photo-initiator" refers to a molecule that creates reactive species when exposed to UV or visible light radiation.

"Polymerization" refers to a method of forming a polymer from a plurality of monomers.

"Silica network" refers to a solid comprising three dimensional intertwined clusters of silica, where the silica comprises 50% or less, 49% or less, 48% or less, 47% or less, 46% or less, 45% or less, 44% or less, 43% or less, 42% or less, 41% or less, 40% or less, 39% or less, 38% or less, 37% or less, 36% or less, 35% or less, 34% or less, 33% or less, 32% or less, 31% or less, 30% or less, 29% or less, 28% or less, 27% or less, 26% or less, 25% or less, 24% or less, 23% or less, 22% or less, 21% or less, 20% or less, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less, of the total volume of solid.

"Supercritical drying" refers to a method of removing liquid in a controlled and precise way. Aerogels can be produced by extracting the liquid component of the gel by supercritical drying. This allows the liquid to be slowly dried off without causing the solid matrix in the gel to collapse from capillary action, as would happen with conventional evaporation.

EXAMPLES

Chemicals

Reagent-grade tetraethyl orthosilicate (TEOS), aluminum chloride hexahydrate ($AlCl_3.6H_2O$), trimethoxysilylpropyl methacrylate (TMSM), methyldiethanolethylamine (amine), and Eosin Y were purchased from Acros Organics. Hexanedioldiacrylate (HDDA) was purchased from Sigma-Aldrich. All reagents were used as-received. An ethanol-water azeotrope mixture (containing 4.4% water and 95.6% pure ethanol by volume) was used as gelation solvent and as supercritical fluid in the drying method for the samples prepared.

Supercritical Drying of Alcogels

The methods of the presently claimed invention followed the same procedure for supercritically drying the samples as reported in a recent publication.[15] Briefly, the alcogels with or without their substrate were placed inside the supercritical dryer, a Parr Instruments model 4602 pressure vessel with a capacity of 2 liters. The pressure vessel was equipped with a thermal well and it was heated by three ceramic heaters, each with a power of 800 W. Heating rates were controlled by varying the power delivered to the heaters with a Variac. To prevent solvent evaporation from the alcogels before the supercritical point was reached, an excess volume (500 mL) vessel was heated to reach the supercritical temperature and pressure of the ethanol-water azeotrope mixture, kept at supercritical conditions for 20 minutes and then vented.

Characterization

FTIR spectroscopic measurements were carried out using a Thermo Scientific Nicolet 6700. A smart iTR diamond ATR accessory was used. Background was subtracted each time while obtaining data from ATR accessory. For each sample, 64 scans were taken with data spacing of 0.482 cm$^{-1}$ and a resolution of 4 cm$^{-1}$.

CPMAS-TOSS solid-state NMR spectra were acquired on a Bruker DRX300WB spectrometer equipped with a 7 mm CPMAS probe. Each sample was packed into a 7 mm Zirconia rotor with Kel-F cap and then spun at 5 kHz at room temperature. The operating frequency was 75.48 and 59.62 MHz for $^{13}$C and $^{29}$Si, respectively. The contact time was 5 ms for $^{29}$Si and 1 ms for $^{13}$C and repetition time was 2 s for both nuclei. The measurement time was sample dependent because of number of scans ranging from 300 to 2000 for $^{13}$C and 1000 to 2000 for $^{29}$Si. A line broadening of 60 Hz ($^{13}$C) and 100 Hz ($^{29}$Si) for each was applied before Fourier transformation. Chemical shift was externally referenced to glycine (C=O carbon at 176.03 ppm) and DSS (sodium salt of 2,2-dimethyl-2-silapentane-5-sulphonic acid, $^{29}$Si at 0 ppm).

For compression testing, an Insight 30 using a 2 kN load cell and compression velocity 0.254 cm min$^{-1}$ was employed. The self-standing samples (without substrate) were placed on the stage horizontally and were tested.

Surface areas were measured with a Micromeritics ASAP 2020 analyzer. Samples with an average weight of 40 mg were outgassed in vacuum for 24 hours at 120° C. In each test, 5 adsorption/desorption points were taken with 3 minutes of equilibration time between each measurement and tolerance of 0 at 77.2 K (sample holder submerged in liquid nitrogen). The surface area values were calculated according to the BET model using these points of the adsorption curve.

A Scanning Electron Microscope (model: Hitachi SU-70) was used to image aerogel samples. The nominal thickness of the samples was <1 mm, and they were placed on carbon conductive tabs adhered to the sample mount. A strip of adhesive copper tape, connecting the sample and sample mount, was placed in contact with each piece of aerogel to avoid charging during imaging. The samples were sputter coated for 30 seconds with gold and then imaged. High Resolution Transmission Electron Microscopy (HRTEM; model: JEOL JEM-2100F) was used for the morphological characterization of the samples.

Sample Preparation

For alcogel fabrication, two solutions were prepared and kept in separate polypropylene containers before mixing.

In one non-limiting example:

Solution A was prepared by mixing 0.88 mL (4.0 mmol) of tetraorthosilicate (TEOS), 0.04 mL (0.2 mmol) of 3-(trimethoxysilyl)propyl methacrylate (MTMS) and 1.35 mL of ethanol-water azeotrope mixture in which AlCl$_3$.6H$_2$O had been dissolved (concentration: 1.4 mmol L$^{-1}$). Solution A was heated in an 800 W microwave oven for 30 seconds.

Solution B was prepared by mixing 0.15 mL (0.87 mmol) of Eosin Y dissolved in ethanol, 0.05 mL (0.44 mmol) of methyldiethanolethylamine (amine), 1.1 mL (5.0 mmol) of hexanedioldiacrylate (HDDA) and 0.5 mL ethanol-water azeotrope.

The reactants and their functions in this example are summarised in the following tables:

| | | Solution A | | | |
|---|---|---|---|---|---|
| | Function | Chemical name | Abbreviated name | Amount | No. of moles |
| 1A | Alkoxide | Tetraethyl orthosilicate | TEOS | 0.88 ml | 4.0 mmol |
| 2A | Lewis acid | Aluminium chloride hexahydrate | AlCl$_3$•6H$_2$O | 1.35 ml (of 0.015 g in 45 ml EtOH) | 0.002 mmol |
| 3A | Coupling agent | 3-(trimethoxysilyl) propyl methacrylate | MTMS | 0.04 ml (dissolved in 0.5 ml EtOH) | 0.2 mmol |

| | | Solution B | | | |
|---|---|---|---|---|---|
| | Function | Chemical name | Abbreviated name | Amount | No. of moles |
| 1B | Tertiary amine (co-initiator) | N-methyldiethanolamine | MDA | 0.05 ml | 0.45 mmol |
| 2B | Radical photoinitiator | 2-(2,4,5,7-tetrabromo-6-oxido-3-oxo-3H-xanthenyl-9-yl) benzoate | Eosin Y | 0.15 ml (of solution, 4 g/l in EtOH) | 0.87 mmol |
| 3B | Monomer | 1,6-hexanediol diacrylate | HDDA | 1.1 ml | 5.0 mmol |

Eosin Y, which absorbs in the green region of the visible spectrum, was used as the photo-initiator and the tertiary amine acted as co-initiator and pH modifier.

Solution A was mixed with solution B and the resulting solution (sometimes referred to as the pre-gelation mixture in this specification) was heated in an 800 W microwave oven for 30 seconds. By applying microwave heating before gelation, the present inventors found that the pre-gelation mixture was uniformly heated to from 50 to 60° C., thus forming a gel instantly. Instantaneous gelation is necessary to permit formation of an aerogel.

In this example, a 2 Watt, continuous wave, diode-pumped solid-state laser emitting light at a wavelength of 532 nm was employed to apply laser light to the pre-gelation mixture. In other examples, a laser source emitting light at a wavelength of 532 nm plus or minus 10% can be used. However, gelation will take longer if the power source is less than 2 Watts. Upon light absorption, it is believed that charge is transferred between Eosin Y and the amine, resulting in a reduced radical dye and a radical capable of initiating polymerization.[16,17] During 3D printing, gelation was almost instantaneous upon irradiation. The solution preparation and 3D printing method is illustrated schematically in FIG. 1.

Figure 2:
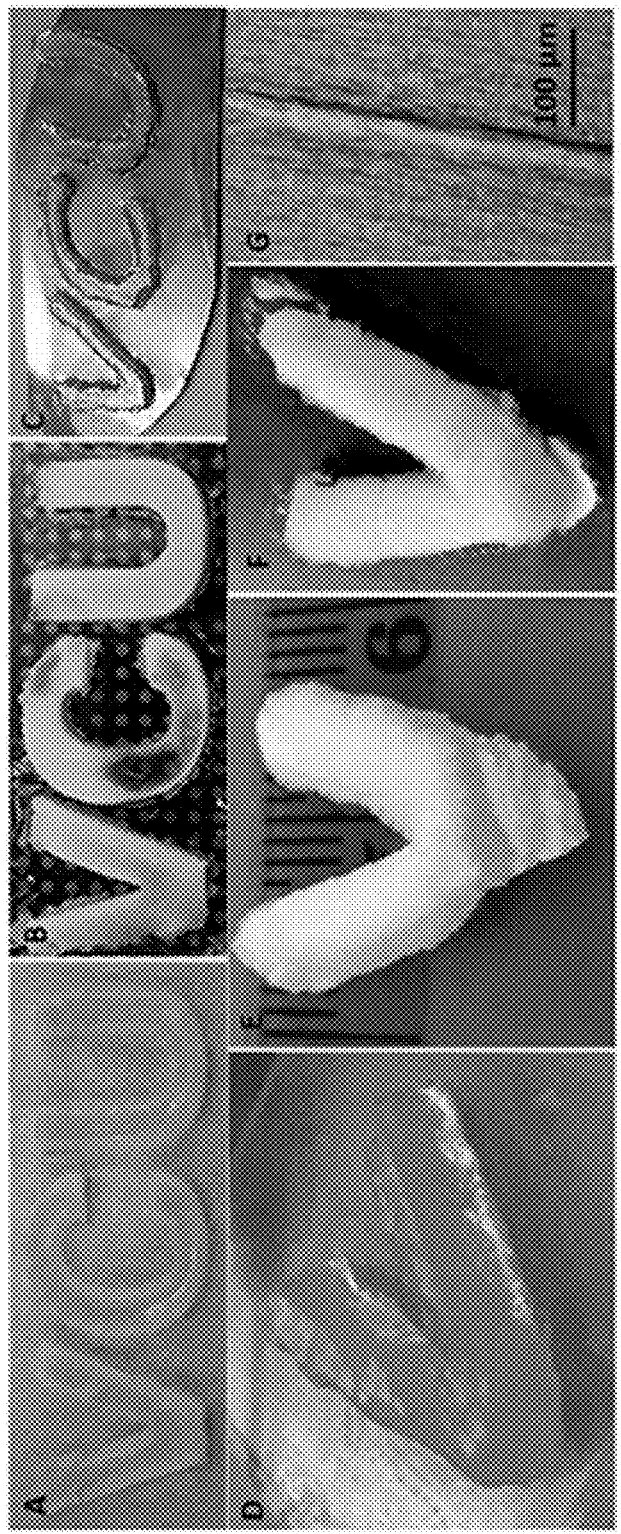
FIG. 2 shows letters printed using mask, (A) on laminated paper, (B) on glass, (C) on a silicon wafer, (D) on glass, and letter "V" was dried at supercritical conditions and shown as: (E) without substrate, (F) on glass substrate, whereas (G) shows a line printed without mask on glass. The typical thickness of the letters is 2-4 mm whereas each letter has dimensions of 12 mm×15 mm.

A layer by layer technique was used for 3D printing where solution mixture was added to a Petri dish covered with a stencil mask. Light was directed through the cut-out holes of the letters to gel the solution underneath and then another quantity of mixture was added. Light was redirected through the cut-out holes and it was repeated until the desired thickness of the letters was achieved. The aerogel material showed good adhesion to substrate and good rigidity as a self-standing object (FIG. 2).

Alternative Reagents

With reference to the reactants of solutions A and B referred to above, the following reagents can be used in alternative examples:

1A: TEOS can be replaced by tetramethyl orthosilicate (TMOS).

2A: AlCl$_3$-6H$_2$O can be replaced by aqueous HCl.

3A: MTMS can be replaced by vinyltrimethoxysilane or allyltrimethoxysilane.

1B: MDA can be replaced by N-ethyldiethanolamine or ammonium hydroxide.

2B: Eosin Y can be replaced by Eosin B or Eosin Y disodium salt.

3B: HDDA can be replaced by vinyl acrylate, vinyl methacrylate, 1,4-butanediol diacrylate, glycerol 1,3 diglycerolate diacrylate, styrene, methyl methacrylate, butyl methacrylate, butyl acrylate, tert-butyl acrylate, tris(2-acryloyloxyethyl) isocyanurate, neopentyl glycol diacrylate, pentaerythritol tetraacrylate, trimethylolpropane triacrylate, di(trimethylolpropane) tetraacrylate, glycerol propoxylate (1PO/OH) triacrylate, bisphenol A ethoxylate diacrylate, 1,3,5-triacryloylhexahydro-1,3,5-triazine, glycerol 1,3-diglycerolate diacrylate, trimethylolpropane propoxylate triacrylate or pentaerythritol triacrylate.

Reference above the a reagent being "replaced" means that each respective reactant named in solution A or solution B can be replaced in whole or in part by any one or more of the alternative named reactants.

The amount of the reagents stated in the tables referring to solution A or solution B list the molar amounts of the reactants. In alternative examples, the molar amounts of each respective reactant, or the alternative reactants listed above, can be changed by up to 25%, or up to 24%, or up to 23%, or up to 22%, or up to 21%, or up to 20%, or up to 19%, or up to 18%, or up to 17%, or up to 16%, or up to 15%, or up to 14%, or up to 13%, or up to 12%, or up to 11%, or up to 10%, or up to 9%, or up to 8%, or up to 7%, or up to 6%, or up to 5%, or up to 4%, or up to 3%, or up to 2%, or up to 1%.

Microwave Heating

In the above non-limiting example, solution A was mixed with solution B and the resulting solution (sometimes referred to as the pre-gelation mixture in this specification) was heated in an 800 W microwave oven for 30 seconds.

In alternative examples, the microwave oven had a power of up to 1200 W, or up to 1100 W, or up to 1000 W, or up to 900 W, or up to 800 W, or up to 700 W, or up to 600 W, or up to 500 W, or up to 400 W.

In alternative examples, the resulting solution (sometimes referred to as the pre-gelation mixture in this specification) was heated by applying microwave radiation for up to 2 minutes, or up to 1.5 minutes, or up to 1 minute, or up to 50 seconds, or up to 40 seconds, or up to 30 seconds, or up to 20 seconds, or up to 10 seconds, or up to 5 seconds, or up to 4 seconds, or up to 3 seconds, or up to 2 seconds, or up to 1 second.

Results and Discussion

The presently claimed method is particularly beneficial because instantaneous gelation spreads within seconds throughout the entirety of the exposed area.

Without wishing to be bound by theory, this rapid gelation can be explained by considering the strong temperature dependence of the gelation method.

While alkoxide hydrolysis is exothermic, condensation is endothermic[18] and it is strongly accelerated when the temperature is increased. For example, the group of Sakka[19] reported a decrease in gelation time of more than one order of magnitude when the temperature was raised from 25 to 80° C.

In the presently claimed method, and without wishing to be bound by theory, polymerization is believed to provide sufficient heat locally to raise the temperature and accelerate the gelation. The theoretical heat evolved when a methacrylate double bond converts is $\Delta H=13.1$ kcal mol$^{-1}$.[20,21] This value agrees well with experimental determinations, which range from 12.2 to 20.2 kcal mol$^{-1}$. The temperature increase of the gelation solution can be estimated as $\Delta T=(n_{mono} \times \Delta H)/(m \times C_p)$, where $n_{mono}$ is the number of monomer moles, m the mass of the solvent and Cp the heat capacity of the solvent. Using the value of $\Delta H$ discussed above and the reagent concentration for this system, we obtain $\Delta T \sim 70$ K, which explains the immediate gelation of the silica precursor solution once polymerization is triggered.

Alternatively, and again without wishing to be bound by theory, one can consider that the energy required by the condensation reaction is between 0.28 and 2.8 kcal mol$^{-1}$.[18,22-24] This energy is about one order of magnitude lower than the energy $\Delta H$ liberated by the double bond conversion, and this also explains the observed rapid gelation.

The direct heating by the laser beam may be considered a reason to cause gelation. However, without wishing to be bound by theory, the present inventors do not think that direct heating played a relevant role in this case. In previous work on quantum dot lithography,[25] for example, direct laser heating was employed to induce chemical reactions. However, a temperature increase was noticed only in the immediate vicinity (40 to 80 microns) when an infrared laser was employed and the laser was focused with a lens. In the presently claimed methods, the laser was not focused and green light was employed, which does not cause heating as infrared light does.

FTIR Analysis

Figure 3:
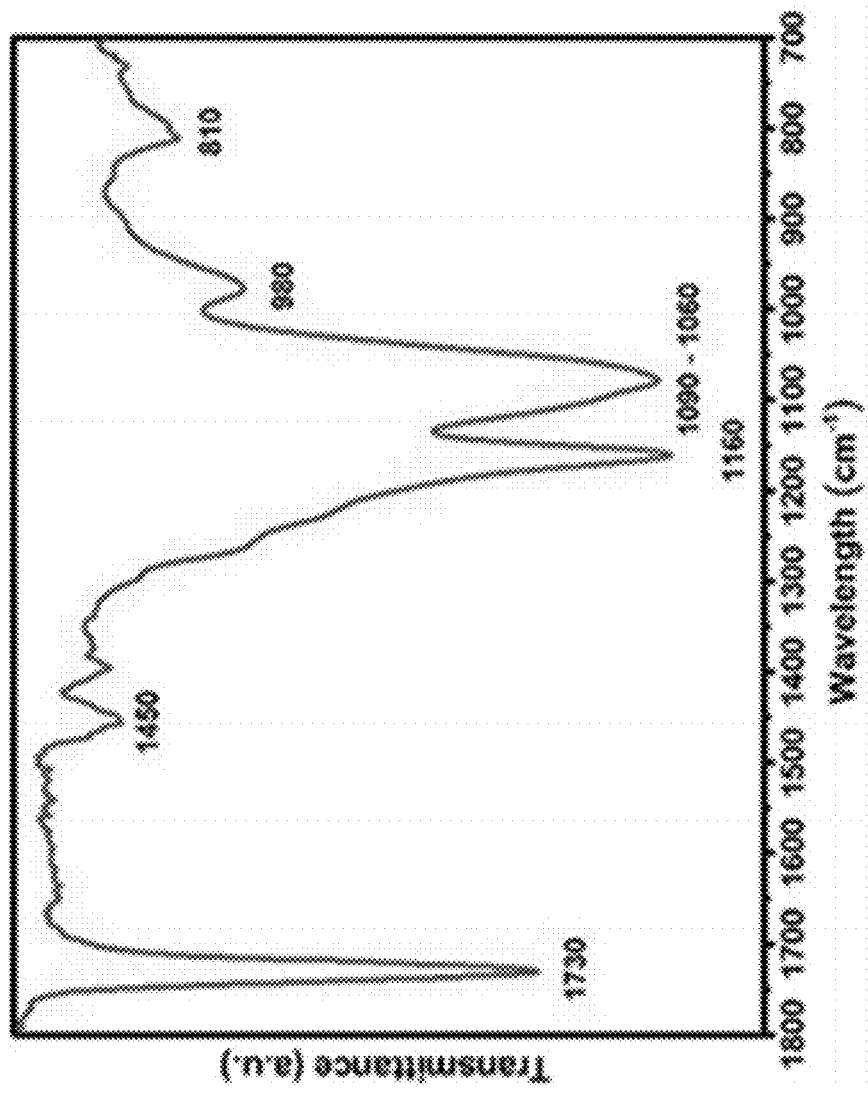
FIG. 3 shows an FTIR spectrum of 3D printed samples after supercritical drying showing formation of silica network and acrylate polymer.

FTIR analysis (FIG. 3) was performed using a Thermo Scientific Nicolet 6700 instrument on the supercritically dried sample to confirm formation of both silica and polyacrylate structures. The spectrum shows the presence of a relatively large band at 1730 cm$^{-1}$, which is attributed to the C=O stretch vibrations, whereas vibrations of C—O from the same ester groups of the polyacrylate appears at 1060 cm$^{-1}$. The absence of a band around 1640 cm$^{-1}$, which corresponds to C=C (acrylic double bond), indicates the formation of polyacrylate and the engagement of TMSM through its acrylic group.

The presence of bands maxima at positions 1160, 1090-1060, 980 structures in the system. The bands centred around 1160 and 1090-1060 cm$^{-1}$ correspond to the intense silicon-oxygen covalent bond vibrations that confirm the formation of silica network. The absorption band around 980 cm$^{-1}$ corresponds to in-plane stretching vibrations of Si—O of the silanol Si—OH groups.[26] The bands appearing around 1090 cm$^{-1}$ and the shoulder at around 1200 cm$^{-1}$ are assigned respectively to the transversal optical and longitudinal optical modes of the Si—O—Si asymmetric stretching vibrations.[27] The band at 810 cm$^{-1}$ reflects symmetric stretching vibrations of Si—C—Si.[28] The comparison of the spectra show formation of silica network and polymerization of HDDA monomer took place in both samples.

NMR Analysis

Solid-state NMR analysis was performed on the samples using a Bruker DRX300WB spectrometer to further confirm the formation of both network structures and to find out any anomaly due to incomplete hydrolysis, condensation or polymerization during extraordinarily fast fabrication of aerogels.

Figure 4:
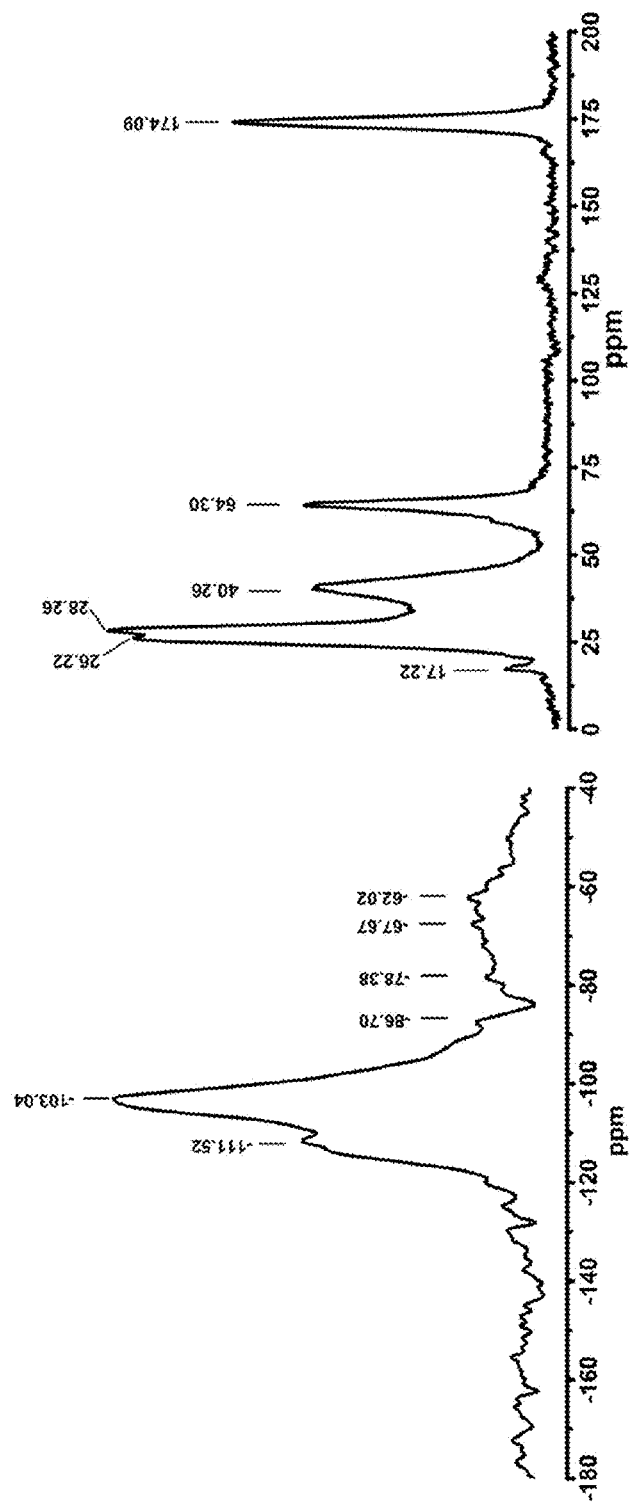
FIG. 4 shows solid-state NMR $^{29}$Si (−180 to −40 ppm) and $^{13}$C spectra (0 to 200 ppm) for supercritically-dried cross-linked aerogels.

The spectrum obtained using $^{29}$Si and $^{13}$C modes are presented in FIG. 4. The $^{29}$Si spectra exhibit two major characteristic peaks at −103.04 ppm due to silanol and −111.52 ppm due to siloxane structures. A very small peak at −67.67 ppm points toward a low concentration of tridentate bonding of TMSM to silica[29] which correlates to the small amount of TMSM in the system. Absence of peaks at −52 ppm and −59 ppm confirms presence of almost no mono or bidentate bonding of TMSM or TEOS to the silica framework which further confirms completion of the hydrolysis and condensation methods.[30] All of these observations indicate the completion of hydrolysis and condensation reactions leading to the formation of silica network structure in all samples.

The $^{13}$C spectrum of the samples show peaks at 26.22, 28.26, 40.26, 64.30, and 174.09 ppm which originate from the aliphatic carbons of HDDA's acrylate polymer. The shift in strong signal of carbonyl carbon of HDDA from 167 ppm to 174.09 ppm in the SC dried sample confirms formation of acrylate polymer. The detailed discussion has been reported in our recent publication[15] whereas here, the discussion is limited to the confirmation of conversion of precursor and monomer to polymer crosslinked-silica structures due to laser illumination.

Morphological Analysis

Figure 5:
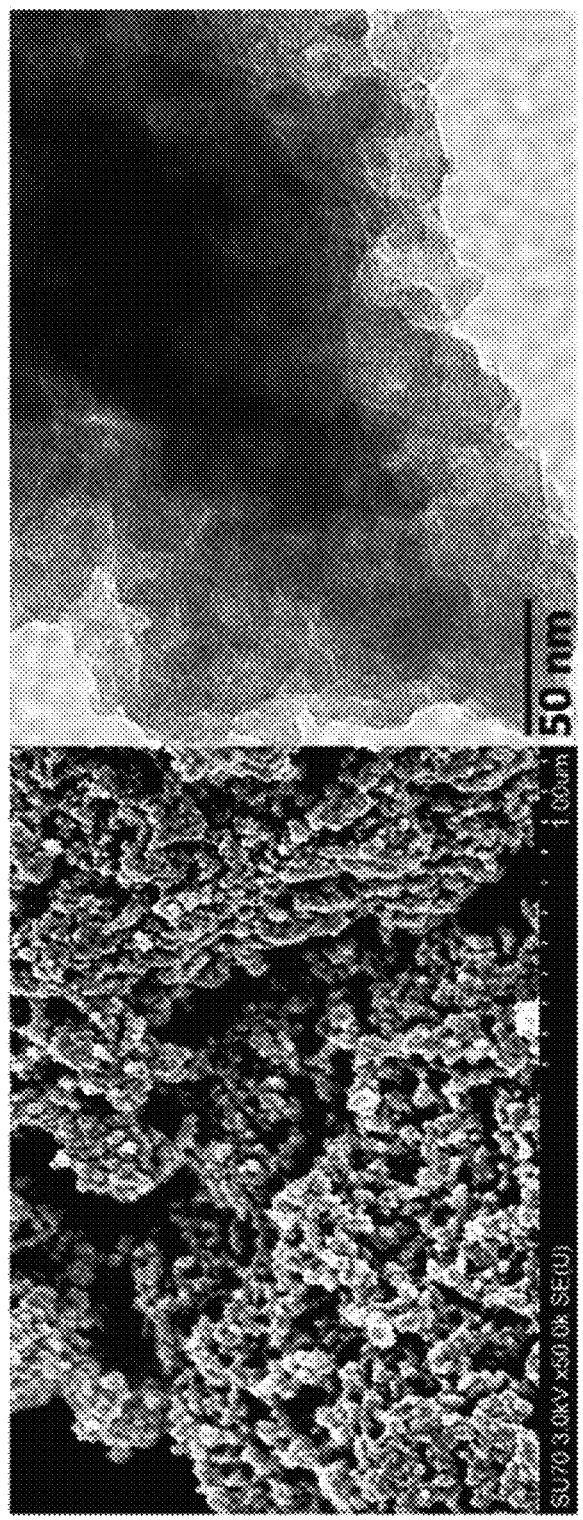
FIG. 5 shows SEM (left) and TEM (right) micrographs of the aerogel samples showing cross-linked secondary particles and a nano-porous structure.

Morphological evaluation of the aerogel materials was performed using SEM and TEM. The SEM and TEM micrographs for the 3D printed letters, depicted in FIG. 5, clearly show the formation and arrangement of secondary particles with a diameter between about 10 and 30 nm, as well as a clearly defined pore structure. Primary particles could not be observed in SEM because of the polymer cross-linking, as is customary for this class of materials.

Physical Properties

Mechanical properties were measured on an Insight 30 and surface area measured using a Micromeritics ASAP 2020 analyser. The average values of physical properties for the 3D printed aerogel samples are: shrinkage (10.4%), density (0.56 g cm$^3$), modulus (81.3 MPa) and BET surface area (155.3 m$^2$ g$^{-1}$). All these values are within the range expected for cross-linked aerogels.[31] Thus, aerogels formed by instantaneous gelation showed comparable properties to aerogels created using conventional fabrication procedures with the added benefit of ease in fabrication.

Polymer crosslinked aerogel materials prepared by the presently claimed method, can be used to print 3D objects. Rapid and efficient production of aerogels occurs following the inclusion of a microwave heating step, prior to irradiation of the reactant mixture by laser light. Irradiation by laser light leads to instantaneous polymerization and gelation. Internal heat changes involved in the crosslinking reactions play an important role in overcoming the activation energy barrier for condensation reactions that lead to instantaneous formation of silica network structure.

Comparable physical properties, including density, modulus, shrinkage and surface area, have been observed for the materials crosslinked and gelled within seconds when compared with those prepared in hours or days using conventional procedures. This significant improvement in the fabrication methods of photo-cross-linked aerogel materials is expected to replace the high density structural materials being used for 3D printing or to be used for other such applications with ultra-low density crosslinked aerogel materials.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. It is anticipated that one or more members of a group can be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this disclosure are described herein, including the best mode known to the inventors for carrying out the disclosure. Of course, variations on these described embodiments will become apparent to those of ordinary skill in the art upon reading the foregoing description. The inventor expects skilled artisans to employ such variations as appropriate, and the inventors intend for the disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Specific embodiments disclosed herein may be further limited in the claims using consisting of or and consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the disclosure so claimed are inherently or expressly described and enabled herein.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

REFERENCES

For the avoidance of doubt, protection may be sought for the features disclosed in any one or more of the referenced documents in combination with this disclosure.

Each of the following references is incorporated herein by reference in its entirety:
1 S. Maury, P. Buisson, A. Perrard and A. C. Pierre, *J. Mol. Catal. B: Enzym.,* 2004, 29, 133-148.
2 M. Schneider and A. Baiker, *Catal. Rev.: Sci. Eng.,* 1995, 37, 41.
3 L. W. Hrubesh, P. R. Coronado and J. H. Satcher, *J. Non-Cryst. Solids,* 2001, 285, 328-332.
4 G. S. Kim and S. H. Hyun, *J. Non-Cryst. Solids,* 2003, 320, 125-132.
5 R. Baetens, B. P. Jelle and A. Gustavsen, *Energ. Build.,* 2011, 43, 761-769.
6 B. Heckman, L. Martin, M. F. Bertino, N. Leventis and T. Tokuhiro, *Sep. Sci. Technol.,* 2008, 43, 1474-1487.
7 S. M. Jones, *J. Sol-Gel Sci. Technol.,* 2007, 44, 255-258.
8 N. Leventis, C. Sotiriou-Leventis, G. H. Zhang and M. M. Rawashdeh, *Nano Lett.,* 2002, 2, 957-960.
9 N. Leventis and H. Lu, in *Aerogels Handbook,* ed. M. A. Aegerter, N. Leventis and M. M. Koebel, Springer, New York, 2011, ch. 13, pp. 251-285.
10 L. S. White, M. F. Bertino, S. Saeed and K. Saoud, *Microporous Mesoporous Mater.,* 2015, 217, 244-252.
11 C. Wingfield, L. Franzel, M. F. Bertino and N. Leventis, *J. Mater. Chem.,* 2011, 21, 11737-11741.
12 L. Franzel, C. Wingfield, M. F. Bertino, S. Mahadik-Khanolkar and N. Leventis, *J. Mater. Chem. A,* 2013, 1, 6021-6029.
13 M. Schmidt and F. Schwertfeger, *J. Non-Cryst. Solids,* 1998, 225, 364-368.
14 A. M. Anderson, C. W. Wattley and M. K. Carroll, *J. Non-Cryst. Solids,* 2009, 355, 101-108.
15 L. S. White, M. F. Bertino, G. Kitchen, J. Young, C. Newton, R. Al-Soubaihi, S. Saeed and K. Saoud, *J. Mater. Chem. A,* 2015, 3, 762-772.
16 H. J. Avens and C. N. Bowman, *J. Polym. Sci., Part A: Polym. Chem.,* 2009, 47, 6083-6094.
17 D. M. Burget, C. Mallein and J. P. Fouassier, *Polymer,* 2004, 45, 7.
18 J. Matsuoka, M. Numaguchi, S. Yoshida and N. Soga, *J. Sol-Gel Sci. Technol.,* 2000, 19, 4.
19 S. Sakka and K. Kamiya, *J. Non-Cryst. Solids,* 1982, 48, 16. 20 K. Miyazaki and T. Horibe, *J. Biomed. Mater. Res.,* 1988, 22, 13.
21 K. Horie, A. Otagawa, M. Muraoka and I. Mita, *J. Polym. Sci., Polym. Chem. Ed.,* 1975, 13, 10.
22 F. D. Osterholtz and E. R. Pohl, *J. Adhes. Sci. Technol.,* 1992, 6, 23.
23 Z. Lasocki, *Bull. Pol. Acad. Sci.: Tech. Sci.,* 1963, 11, 6.
24 J. Chojnowski and S. Chrzezonowicz, *Bull. Pol. Acad. Sci.: Tech. Sci.,* 1965, 13, 5.
25 M. Bertino, in *Aerogels Handbook,* ed. M. A. Aegerter, N. Leventis and M. M. Koebel, Springer, New York, 2011, ch. 19, pp. 403-418.
26 N. O. Gopal, K. V. Narasimhulu and J. L. Rao, *Spectrochim. Acta, Part A,* 2004, 60, 8.
27 A. Duran, C. Sema, V. Fomes and J. M. F. Navarro, *J. Non-Cryst. Solids,* 1986, 82, 9.
28 C. J. Brinker and G. W. Scherer, *Sol-gel Science: The Physics and Chemistry of Sol-gel Processing,* Academic, New York, 1990.
29 L. N. Lewis, T. A. Early, M. Larsen, E. A. Williams and J. C. Grande, *Chem. Mater.,* 1995, 7, 7.
30 S. Ek, E. I. liskola, L. Niinisto, J. Vaittinen, T. T. Pakkanen and A. Root, *J. Phys. Chem. B,* 2004, 108, 10.
31 H. Lu, H. Luo and N. Leventis, in *Aerogels Handbook,* ed. M. Aegerter, N. Leventis and M. M. Koebel, Springer, New York, 2011, ch. 22, pp. 499-535.

The invention claimed is:

1. A method of forming an aerogel, the method comprising the steps of:
    forming a first solution comprising an alkoxide, a Lewis acid and a coupling agent, wherein the molar percentage of reactants in the first solution are:
    alkoxide: 90-98
    Lewis acid: 0.0002-0.0006
    coupling agent: 1.9994-9.9998;
    forming a second solution comprising a radical photoinitiator, a coinitiator and monomers;
    mixing the first solution and the second solution to form a pre-gelation mixture;
    heating the pre-gelation mixture by applying microwave radiation to form a heated pre-gelation mixture; and,
    applying visible laser light to the heated pre-gelation mixture to form an aerogel.

2. The method of claim 1, wherein the method of forming an aerogel is for forming a silica aerogel.

3. The method of claim 1, wherein the method further comprises the step of:
    supercritically drying the aerogel.

4. The method of claim 1, wherein after the step of forming the first solution, the first solution is heated by applying microwave radiation.

5. The method of claim 1, wherein after the step of forming the second solution, the second solution is heated by applying microwave radiation.

6. The method of claim 1, wherein the steps of forming the first solution and forming the second solution include forming the first solution and the second solution in separate vessels.

7. The method of claim 6, wherein the step of mixing the first solution and second solution to form a pre-gelation mixture includes mixing the first solution and the second solution in one vessel.

8. The method of claim 1, wherein the step of heating the pre-gelation mixture by applying microwave radiation to form a heated pre-gelation mixture includes applying microwave radiation at a power of up to 1200 W.

9. The method of claim 4, wherein the step of heating the first solution by applying microwave radiation includes applying microwave radiation at a power of up to 1200 W.

10. The method of claim 1, wherein the step of heating the pre-gelation mixture by applying microwave radiation to form a heated pre-gelation mixture includes applying microwave radiation for up to 2 minutes.

11. The method of claim 1, wherein the microwave radiation is electromagnetic waves produced in microwave ovens.

12. The method of claim 1, wherein the microwave radiation is electromagnetic waves with a frequency of 2.45 GHz (wavelength 12 cm), plus or minus 10%.

13. The method of claim 1, wherein the step of applying visible laser light to the heated pre-gelation mixture to form an aerogel includes applying laser light generated by a 2 Watt, continuous wave, diode-pumped solid-state laser emitting light at a wavelength of 532 nm, plus or minus 10%.

14. The method of claim 3, wherein the step of supercritically drying the aerogel includes drying the aerogel in supercritical ethanol.

15. A method of forming an aerogel, the method comprising the steps of:
  forming a first solution comprising an alkoxide, a Lewis acid and a coupling agent;
  forming a second solution comprising a radical photoinitiator, a coinitiator and monomers, wherein the molar percentage of reactants in the second solution are:
    radical photoinitiator: 6-20
    co-initiator: 5-9
    monomers: 75-85;
  mixing the first solution and the second solution to form a pre-gelation mixture;
  heating the pre-gelation mixture by applying microwave radiation to form a heated pre-gelation mixture; and,
  applying visible laser light to the heated pre-gelation mixture to form an aerogel.

16. The method of claim 1, wherein the alkoxide is an alkoxysilane.

17. The method of claim 1, wherein the alkoxide is tetraethyl orthosilicate or tetramethyl orthosilicate.

18. The method of claim 1, wherein the Lewis acid is aluminium chloride hexahydrate or aqueous hydrochloric acid.

19. The method of claim 1, wherein the coupling agent is 3-(trimethoxysilyl)propyl methacrylate, vinyltrimethoxysilane or allyltrimethoxysilane.

20. The method of claim 1, wherein the radical photoinitiator is Eosin Y, Eosin B or Eosin Y disodium salt.

21. The method of claim 1, wherein the co-initiator is a tertiary amine.

22. The method of claim 21, wherein the co-initiator is N-methyldiethanolamine, N-ethyldiethanolamine or ammonium hydroxide.

23. The method of claim 1, wherein the monomers are 1,6-hexanediol diacrylate, vinyl acrylate, vinyl methacrylate, 1,4-butanediol diacrylate, glycerol 1,3-diglycerolate diacrylate, styrene, methyl methacrylate, butyl methacrylate, butyl acrylate, tert-butyl acrylate, tris(2-acryloyloxyethyl) isocyanurate, neopentyl glycol diacrylate, pentaerythritol tetraacrylate, trimethylolpropane triacrylate, di(trimethylolpropane) tetraacrylate, glycerol propoxylate (1PO/OH) triacrylate, bisphenol A ethoxylate diacrylate, 1,3,5-triacryloylhexahydro-1,3,5-triazine, glycerol 1,3-diglycerolate diacrylate, trimethylolpropane propoxylate triacrylate or pentaerythritol triacrylate.

24. A method of forming an aerogel, the method comprising the steps of:
  forming a first solution comprising an alkoxide, a Lewis acid and a coupling agent, wherein the alkoxide is tetraethylorthosilicate, the Lewis acid is aluminium chloride hexahydrate, and the coupling agent is 3-(trimethoxysilyl) propyl methacrylate, further wherein the molar ratios of the reactants in the first solution are:
    0.9519 tetraethylorthosilicate;
    0.0004760 aluminium chloride hexahydrate;
    0.04760 3-(trimethoxysilyl) propyl methacrylate;
  forming a second solution comprising a radical photoinitiator, a coinitiator and monomers, wherein the radical photoinitiator is Eosin Y, the co-initiator is N-methyldiethanolamine, and the monomers are 1,6-hexanediol diacrylate;
  mixing the first solution and the second solution to form a pre-gelation mixture;
  heating the pre-gelation mixture by applying microwave radiation to form a heated pre-gelation mixture; and,
  applying visible laser light to the heated pre-gelation mixture to form an aerogel.

25. A method of forming an aerogel, the method comprising the steps of:
  forming a first solution comprising an alkoxide, a Lewis acid and a coupling agent, wherein the alkoxide is tetraethylorthosilicate, the Lewis acid is aluminium chloride hexahydrate, and the coupling agent is 3-(trimethoxysilyl) propyl methacrylate,
  forming a second solution comprising a radical photoinitiator, a coinitiator and monomers, wherein the radical photoinitiator is Eosin Y, the co-initiator is N-methyldiethanolamine, and the monomers are 1,6-hexanediol diacrylate, further wherein the molar ratios of the reactants in the second solution are:
    0.138 Eosin Y;
    0.0712 N-methyldiethanolamine;
    0.79 1,6-hexanediol diacrylate;
  mixing the first solution and the second solution to form a pre-gelation mixture;
  heating the pre-gelation mixture by applying microwave radiation to form a heated pre-gelation mixture; and,
  applying visible laser light to the heated pre-gelation mixture to form an aerogel.

26. The method of claim 5, wherein the step of heating the second solution by applying microwave radiation includes applying microwave radiation at a power of up to 1200 W.

* * * * *

UNITED STATES PATENT AND TRADEMARK OFFICE
CERTIFICATE OF CORRECTION

| | | |
|---|---|---|
| PATENT NO. | : 9,745,439 B1 | Page 1 of 1 |
| APPLICATION NO. | : 15/151059 | |
| DATED | : August 29, 2017 | |
| INVENTOR(S) | : Khaled M. Saoud et al. | |

It is certified that error appears in the above-identified patent and that said Letters Patent is hereby corrected as shown below:

At Column 7, Line 41, should read --...samples was $\leq 1$ mm, and...--.

At Column 9, Line 23, should read --References above to a reagent...--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*